2,889,336
STYRENE ENDOPEROXIDES

Heinrich Hock, Clausthal-Zellerfeld, Germany, assignor to Ruhrchemie Aktiengesellschaft, Oberhausen-Holten, Germany, a corporation of Germany No Drawing. Application November 24, 1954
Serial No. 471,099

Claims priority, application Germany December 3, 1953

5 Claims. (Cl. 260—340.3)

This invention relates to, and has as its object, the production of styrene endoperoxides.

The oxidation of suitable vinyl compounds such as α-methyl styrene with oxygen or oxygen-containing gases is known. Under suitable conditions it was believed that the oxygen would add at the 1-4 position to the conjugated double bonds present in the styrene molecule. Though the action of oxygen upon these and similar compounds has repeatedly been investigated in the past, it was never possible to recover the actual primary products formed or to prove the existence of the same. The products formed by the oxidation always consisted predominantly of resinous compounds and sometimes of certain decomposition products which were without commercial importance. In addition, the true nature of the reaction which actually occurred was not at all recognized.

It has now been found in accordance with the invention that styrene endoperoxides may be obtained by intimately contacting a substitued styrene hydrocarbon and preferably α-methyl styrene with molecular oxygen at a relatively low temperature and for a limited period of time. In addition to α-methyl styrene, other styrene derivatives may also be converted by the process of the invention. Thus β-methyl styrene gives benzaldehyde and acetaldehyde. The conversion of α-ethyl styrene gives phenyl-ethyl ketone ($C_6H_5.CO.C_2H_5$) and formaldehyde. β-Ethyl styrene, when converted in accordance with the invention, gives benzaldehyde and propionic aldehyde.

To convert these and similar styrene hydrocarbons into the corresponding cyclic endoperoxides, the hydrocarbon is treated for two days with elementary oxygen at a temperature of about 40–45° C. while stirring. The reaction is preferably discontinued when about 15–20% of the hydrocarbon have been converted into peroxide. Sometimes, the conversion may be continued until the content of peroxide has increased to about 25%. In these cases the conversion temperature is preferably reduced to about 40° C.

Peroxide concentrations in excess of 25% are not recommendable, because, under these conditions, a part of the peroxide formed is converted into resinous products in an undesirable manner.

Under these reaction conditions undesirable side reactions are practically completely avoided and it is possible to obtain a well defined reaction product in the form of a styrene endoperoxide in which the vinyl portion of the styrene has formed a second ring incorporating the peroxide linkage.

It is possible under these reaction conditions, for example, to convert α-methyl styrene into a cyclic organic peroxide which may be designated as α-methyl styrene endoperoxide in accordance with the following equation:

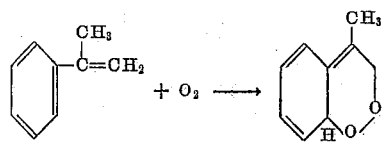

The styrene endoperoxides obtained in accordance with the invention may be split with acids such as dilute sulfuric acid to form two oxo compounds. Thus, for example, the above identified α-methyl styrene endoperoxide may be converted into acetophenone and formaldehyde by treatment with acid. This indicates that the splitting takes place at the original double bond of the vinyl hydrocarbon used as a starting material.

Other substituted styrenes may also be used in accordance with the invention. It is thus, for example, possible to form two ketones by the oxidation and the subsequent splitting with acids. A high yield of oxo compounds of this kind is obtainable by auto-oxidation of the hydrocarbons mentioned. The decomposition with acids of the primarily formed peroxides may be effected at atmospheric or elevated pressure.

The endoperoxides (cyclic peroxides) produced in accordance with the invention are novel and hitherto unknown compounds. These compounds may be obtained in a completely pure form by chromatographic adsorption. A recovery by fractional distillation is generally hardly possible since the peroxides obtained in accordance with the invention may undergo a decomposition at temperatures of as low as up to 100° C. The pure peroxide which, for example, has been obtained in accordance with the invention from α-methyl styrene boils under a pressure of 0.07 Torr. at 70° C. Its setting point is −5° C. At 83° C., deflagration takes place with the evolution of gas. The decomposition products contain formaldehyde and acetophenone.

The following example is given by way of illustration and not limitation:

Example

Oxygen was passed for 24 hours at 45° C. into 500 cc. of α-methyl styrene while vigorously stirring. The flow rate of the gaseous oxygen was 2–3 liters per hour. 30–45% of the hydrocarbon was absorbed by the oxygen passed through with the formation of peroxide. The oxygen which was not consumed was recirculated through the reaction vessel together with fresh oxygen.

After about 100 gms. of peroxide had formed in the reaction mixture which corresponded to a peroxide content of about 20%, the excess hydrocarbon was distilled off under a pressure of 2–3 Torr. and at 50° C. The α-methyl styrene distilled off and comprising about 80% of the amount originally charged could be used for a new batch.

Sometimes, a partial cleavage of the peroxide occurred as early as in the removal of the excess hydrocarbon by distillation. This resulted in the formation of the two oxo compounds desired which were separately collected.

The peroxide obtained as the distillation residue and comprising about 100 grams was mixed with 100 grams of 20% sulfuric acid. The mixture was heated for 1–2 hours at about 105° C. while constantly stirring. This resulted in the complete cleavage of the peroxide with the formation of acetophenone and formaldehyde. The formaldehyde distilled off in the gaseous state and was condensed.

Thereafter, the acid added was mechanically separated from the reaction mixture which in turn was separated by fractional distillation into acetophenone and formaldehyde still present. In this manner, a total of 76 grams of acetophenone and 19 grams of formaldehyde was obtained.

The sulfuric acid separated could be used for a new batch.

The action of the oxygen could also be effected under an elevated pressure such as a pressure of 3–4 kg./sq. cm. This resulted in an acceleration of the reaction. The time required for the cleavage of the peroxides could also be cut by operating at an elevated pressure of about 3 kg./sq. cm. and at a temperature of 130–140° C.

Instead of sulfuric acid, other acids such as dilute phosphoric acid may also be used for the decomposition of the peroxides.

I claim:

1. Process for the production of endoperoxides, which comprises intimately contacting a styrene α substituted at the vinyl group with a lower alkyl group with molecular oxygen at a temperature of about 40–45° C., discontinuing the action of the oxygen before a peroxide content in the reaction mixture in excess of about 15–20% is reached, and recovering the reaction product formed.

2. Process according to claim 1, in which said styrene is α-methyl styrene.

3. Process according to claim 1, which includes decomposing the peroxides from the reaction product with dilute sulfuric acid at a temperature above about 100° C.

4. Process according to claim 3, in which said styrene is α-methyl styrene.

5. Process according to claim 3, in which said decomposition with sulfuric acid is effected at elevated pressure.

References Cited in the file of this patent

UNITED STATES PATENTS 2,197,101   Eaglesfield _____ Apr. 16, 1940

OTHER REFERENCES

Boardman et al.: JACS, vol. 72, pp. 1372–1377 (1950).

Barnes et al.: JACS, vol. 72, pp. 210–215 (1950).

Bundy et al.: Styrene, Reinhold Publg. Corp., N.Y. (1952), pages 257–9.